(12) United States Patent
Mallen

(10) Patent No.: US 6,359,062 B1
(45) Date of Patent: Mar. 19, 2002

(54) COATING COMPOSITIONS

(75) Inventor: Thomas R. Mallen, Zelienople, PA (US)

(73) Assignee: The Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/260,958

(22) Filed: Mar. 2, 1999

(51) Int. Cl.[7] .................. C08G 63/91; C08L 29/04; C08L 51/00

(52) U.S. Cl. .................. 525/58; 523/407; 523/408; 528/103

(58) Field of Search .................. 525/58; 523/407, 523/408; 528/103

(56) References Cited

U.S. PATENT DOCUMENTS

| | | | |
|---|---|---|---|
| 2,474,292 A | * 6/1949 | Weidner et al. | 525/58 X |
| 3,438,849 A | * 4/1969 | Isack | 528/103 X |
| 3,607,598 A | * 9/1971 | LeBlanc et al. | 525/58 X |
| 4,212,781 A | 7/1980 | Evans et al. | |
| 4,247,439 A | 1/1981 | Matthews et al. | |
| 4,285,847 A | 8/1981 | Ting | |
| 4,302,373 A | 11/1981 | Steinmetz | |
| 4,308,185 A | 12/1981 | Evans et al. | |
| 4,355,122 A | 10/1982 | Fan | 523/423 |
| 4,399,241 A | 8/1983 | Ting et al. | 523/400 |
| 4,446,258 A | 5/1984 | Chu et al. | 523/406 |
| 4,476,258 A | 10/1984 | Hiles | 523/212 |
| 4,476,262 A | 10/1984 | Chu et al. | 523/412 |
| 4,480,058 A | 10/1984 | Ting et al. | 523/404 |
| 4,581,394 A | * 4/1986 | Yoshida et al. | 523/407 |
| 5,296,525 A | 3/1994 | Spencer | 523/408 |
| 5,338,781 A | * 8/1994 | Gallo | 528/103 X |
| 5,500,463 A | * 3/1996 | Nishimura et al. | 523/408 |
| 5,527,840 A | 6/1996 | Chutko et al. | 523/412 |
| 5,567,781 A | 10/1996 | Martino et al. | 525/438 |
| 5,635,049 A | 6/1997 | Mysliwczyk et al. | 523/402 X |
| 5,830,952 A | 11/1998 | Pederson et al. | 525/531 |
| 5,977,253 A | 11/1999 | Warakomski | 525/58 |

FOREIGN PATENT DOCUMENTS

| | | | |
|---|---|---|---|
| EP | 0006334 | 1/1980 | C08G/81/02 |
| JP | 52006742 | 1/1977 | C08L/61/12 |
| JP | 57070151 | 4/1982 | C08K/7/02 |
| JP | 61-231023 | * 10/1986 | 525/58 |
| JP | 63048361 | 3/1988 | C09D/3/58 |
| WO | WO94/17111 | 8/1994 | C08F/20/00 |
| WO | WO96/10612 | 4/1996 | C09D/5/00 |

* cited by examiner

Primary Examiner—Richard D. Lovering
(74) Attorney, Agent, or Firm—Schwegman, Lundberg, Woessner & Kluth, P.A.

(57) ABSTRACT

Coating composition including a film-forming component, further including (a) a product formed by reacting a mixture including carboxy functional polymer, hydroxy functional polymer, or a mixture thereof, or ethylenically unsaturated monomer, with epoxy resin, and (b) a polyvinyl alcoholic-containing phenolic resol resin. Also provided is a method of coating a metal substrate with said coating composition. Further provided is a composite material comprising a metal substrate having at least one surface covered with a cured film of the coating composition.

31 Claims, No Drawings

COATING COMPOSITIONS

BACKGROUND OF THE INVENTION

Coatings are applied to the interior of metal food and beverage cans to prevent the contents from coming into contact with the metal surfaces of the containers. Contact of the can contents with the metal surface, especially where acidic products such as soft drinks, tomato juice or beer are involved, can lead to corrosion of the metal container and result in contamination and deterioration of the contents. Coatings are applied to the interior of food and beverage cans also to prevent corrosion in the headspace of the cans between the fill line of the food product and the can lid, which is problematic particularly with food products with high salt content.

Can interiors are typically coated with a thin thermoset film to protect the interior metal surface from its contents. Synthetic resin compositions which include vinyls, polybutadiene, epoxy resins, alkyd/aminoplast and oleoresinous materials have typically been utilized as interior can coatings. These heat-curable resin compositions are usually applied as solutions or dispersions in volatile organic solvents.

Coatings used for food and beverage cans are generally applied and cured into films at high speed, on high speed coating lines (e.g., coil coating lines). Modern high speed coating lines require coatings that will dry and cure within a few seconds as it is heated very rapidly to peak metal temperatures of 450° F. to 550° F. (about 230° C. to about 300° C.).

High molecular weight polyesters have been used increasingly in recent years as metal can coatings. However, these polymers can suffer from a lack of solvent and headspace corrosion resistance because only their end groups are reactive with crosslinking agents. Moreover, the very short curing conditions further decrease the level of crosslinking in the baked film and the resistance to corrosion. Accordingly, there is a need for coatings which can provide superior solvent and headspace corrosion resistance upon faster rates of cure.

SUMMARY OF THE INVENTION

The present invention provides coating compositions including a film-forming component and an optional solvent component. The film-forming component includes (a) resin derived from a mixture including polymer containing alcohol and/or carboxylic acid functional groups, reacted with epoxy resin, and (b) phenolic resin that includes a polyvinyl alcoholic component. The coating composition generally also includes a solvent component, which may include organic solvent, water, or a mixture thereof.

The present invention also provides a method of coating a metal substrate to provide a cured film on at least one surface of the substrate. The method includes applying the coating composition onto the surface of the metal substrate to form a coating layer. The coated metal substrate is then heated so that the coating layer cures to form a cured film adhered to the substrate surface. The coated metal substrate is typically cured, for example, by heating for about 2 to about 20 seconds in an oven at a temperature of about 230° C. to about 300° C.

The present invention also provides a composite material which includes a metal substrate having at least one surface covered with a cured film, which is the result of coating the substrate surface with the above-described coating composition and heating the coated metal substrate.

DETAILED DESCRIPTION OF THE PREFERRED EMBODIMENT

The present invention relates to protective coatings for metal surfaces and provides coating compositions which are particularly useful for protecting the interior of food and beverage cans. The inventive coating compositions include a film-forming component, including (a) a first resin component which can be produced by reacting carboxy functional polymer and/or hydroxy functional polymer with epoxy resin in the presence of a tertiary amine catalyst, and (b) polyvinyl alcoholic-containing resol phenolic resin. The first resin component can also be produced by reacting a resin which includes both epoxy and carboxy functional groups, optionally in the presence of additional epoxy resin (s) and/or alcohol and/or carboxy functional resin(s). In one embodiment, the film-forming component includes (a) the reaction product of an acid functional graft epoxy resin, and (b) phenolic resin that includes a polyvinyl alcoholic component. The coating compositions of the present invention typically have a faster rate of cure, greater solvent resistance and/or greater resistance to corrosion than conventional coating compositions. The coating compositions can also exhibit greater resistance to headspace corrosion than conventional coatings. The coating solids include all materials that remain on the coated article after the oven baking used to form the dry, thermoset coating. The amount of coating solids in the inventive coatings is typically at least about 35 wt. %, and preferably about 40 to about 50 wt. %.

The film-forming component of the coating compositions of the present invention contains one or more thermoplastic polymers capable of reacting with phenolic resins. The thermoplastic polymeric material is not critical, as long as it contains chemical groups that are reactive with phenolic resins, such as carboxylic acid and/or alcohol groups. A variety of polymeric materials may be used either singularly or in combination. The polymeric material typically used in the present invention includes carboxy functional and/or hydroxy functional polymers. It should be appreciated that polymers which are not carboxy functional or hydroxy functional, but which can be so functionalized, such as polyesters, polyvinyl chloride, polyvinyl acetate and polycarbonate, are also suitable for use in the present invention.

In one preferred embodiment of the invention, the thermoplastic polymer composition includes an epoxy-based resin, which is formed from epoxy resin and polymer capable of reacting with phenolic resins, such as carboxy functional and/or hydroxy functional polymer. The epoxy based-resin may be used singularly or may be combined with acrylic-based polymer and/or other polymers or resins, including polyesters, polyvinyl chloride, polyvinyl acetate and polycarbonate. Epoxy resin-based compositions commonly used in coating compositions are well-known in the art. Suitable epoxy resin-based polymer s for use in the present composition are disclosed, for example, in U.S. Pat. No. 5,567,781 to Martino et al., 5,635,049 to Mysliwczyk et al., U.S. Pat. No. 5,527,840 to Chutko et al., U.S. Pat. No. 5,296,525 to Spencer, U.S. Pat. No. 4,480,058 to Ting et al., U.S. Pat. No. 4,476,262 to Chu et al., U.S. Pat. No. 4,446,258 to Chu et al., U.S. Pat. No. 4,302,373 to Steinmetz, U.S. Pat. No. 4,247,439 to Matthews et al., and EP Patent No. 0 006 334 B1 to Brown et al., disclosures of which are hereby incorporated by reference.

In one embodiment of the invention, the epoxy-based resin is formed from a mixture which includes epoxy resin and a carboxy functional polymer. The epoxy resin-based polymer may be made by reacting a mixture including carboxy functional polymer and epoxy resin in the presence of a tertiary amine catalyst. The carboxy functional polymer is typically produced by reacting a mixture including one or more ethylenically unsaturated carboxylic acid monomers and one or more copolymerizable nonionic monomers. Preferred ethylenically unsaturated carboxylic acid monomers for use in forming the carboxy functional polymer invention include alpha, beta-unsaturated carboxylic acids, such as acrylic and methacrylic acid. Suitable nonionic monomers include lower alkyl acrylates (e.g., ethyl acrylate), lower alkyl methacrylates, hydroxy alkyl acrylates, hydroxy alkyl methacrylates, styrene, alkyl-substituted styrenes, vinyl acetate and acrylonitrile. The carboxy functional polymer may be reacted with any organic solvent-soluble resin containing epoxy groups in the presence of a tertiary amine catalyst.

The properties of the carboxy functional polymer vary depending upon the particular carboxy functional polymer selected. Typically, the carboxy functional polymer has a weight average molecular weight of about 2,000 to 60,000, more preferably from about 5,000 to 30,000 and most preferably about 7,000 to 20,000. The carboxy functional polymer typically has an acid number of at least about 165, more typically about 200 to about 530 and preferably about 300 to about 400. Acid number is defined as the amount of potassium hydroxide in mg required to neutralize one gram of polymer, on a solids basis. The glass transition temperature of the carboxy functional polymer generally is no more than 110° C. and preferably about 40° C. to about 100° C.

Polymers which are not carboxy functional or hydroxy functional, but which can be so functionalized, are also suitable for use in forming the epoxy-based resin. Such polymers may include polyesters, polyvinyl chloride, polyvinyl acetate, polyurethane and/or polycarbonate, which compositions and their manufacture are well known in the art, such as disclosed in U.S. Pat. No. 5,567,781 to Martino et al., which is incorporated herein by reference. Martino, for example, discloses manufacturing a polyester-epoxy resin as the reaction product of a diepoxide resin, a carboxy functional polyester resin and a hydroxyl-reactive crosslinking agent. The polyester prepolymer reactant may be made with any diacid and dihydric alcohol or polyether. A polyester-epoxy resin based composition is particularly effective, because the polyester components can enhance flexibility and reduce viscosity of the coating materials used during manufacture.

For the purposes of this invention, the terms "carboxy functional polymer" and "hydroxy functional polymer" do not include compounds with epoxy functionality. Any epoxy resin which does contain one or more carboxy functional and/or hydroxy functional groups will constitute "epoxy resin," as that term is used herein. In other words, "epoxy resin," as used herein, means polymer containing one or more epoxy groups, which may or may not also contain one or more carboxy functional and/or hydroxy functional groups.

Any epoxy resin may be included in the epoxy resin-based polymer. Typically, the epoxy resin includes glycidyl polyethers having one or more epoxide group per molecule (i.e., glycidyl ethers containing an average of at least one and generally greater than 1.0 epoxy groups per molecule). The glycidyl polyethers commonly have an average of about 2.0 to about 2.5 epoxide groups per molecule. Diglycidyl ethers of dihydric phenols, such as is Bisphenol A (p,p'-dihydroxy-2,2-diphenyl propane), are particularly suitable. The epoxy resins typically used in the present invention may be derived from the reaction of dihydric phenol and an epihalohydrin, such as epicholorohydrin. Epoxy resins based on Bisphenol A and epichlorohydrin are especially suitable, because these compounds have been approved in the United States by the Food and Drug Administration for use in can coatings.

The preferred epoxy resins have epoxy values ranging from about 0.02 to about 0.5 equivalents of epoxide per gram. The epoxy resin desirably has a number average molecular weight ranging from about 350 to about 8,000 and more preferably from about 2,000 to about 6,000. The epoxy resin typically has an epoxide equivalent weight ("EEW") ranging from about 150 to about 8,000, more preferably ranging from about 1,000 to about 5,000. Suitable commercial epoxy resins include Epon 828, which is a 1,2-diepoxide resin having a number average molecular weight of approximately 385 and an EEW of 185–192, and Epon 1009F and Epon 1007F (which have EEW's of 2,300 to 3,800 and 1,700 to 2,300, respectively), all available from Shell Chemical Company, Houston, Tex. Low molecular weight epoxy resins such as Epon 828 may be chain extended, for example, by reaction with a bisphenol, such as Bisphenol A, or with an aliphatic or aromatic diacid.

The epoxy resin may include diglycidyl ethers of dihydric phenols whose molecular weight has been increased ("upgraded") by reaction with additional dihydric phenol or with diacid. The diacid may be aliphatic diacid, aromatic diacid, or a mixture thereof. The inclusion of a higher molecular weight epoxy resin can improve the flexibility of the coating composition and, in particular, improve the resistance of the coating to crazing during fabrication. It has been found that incorporation of an epoxy resin which has been upgraded by reaction with one or more aliphatic diacids may lower the viscosity of the epoxy resin as well as improve the flexibility of the coating ultimately formed from the coating composition. Aliphatic diacids are particularly preferred. Suitable aliphatic diacids which may be employed include short chain aliphatic diacids (i.e., diacids which have no more than 8 carbon atoms, such as adipic acid and succinic acid), dimer fatty acid and the like. The aromatic diacids typically have no more than about 12 carbon atoms. Exemplary aromatic diacids include terephthalic acid and isophthalic acid.

For example, the epoxy resin may include a diglycidyl ether of Bisphenol A which has been upgraded to an EEW of about 2,500 to about 8,000 by reaction with an aliphatic diacid such as adipic acid. The type of diacid employed in the upgrade will depend on a number of factors, such as the molecular weight of the diacid, the EEW of the starting epoxy resin and the desired EEW for the epoxy resin. Typically, the amount of diacid used to upgrade the epoxy resin ranges from about 0.1 to about 10 wt. % and, preferably, from about 0.5 to about 5 wt. % of the epoxy resin component.

The film-forming component of the coating compositions of the present invention also contains polyvinyl alcoholic-containing phenolic resin. This resin may be made by reacting a mixture including a phenol, an aldehyde and a polyvinyl alcoholic compound, such as specified in U.S. patent application Ser. No. 09/032,907 filed on Mar. 2, 1998, by Warakomski, entitled "Phenolic Thermosetting Resins Containing Polyols" (hereinafter "Warakomski", which is incorporated herein by reference. The phenolic resin can be formed by reacting a phenol and formaldehyde in the presence of a polymerization catalyst, and a polyvinyl alcoholic compound. The phenol may include an alkyl phenol, a bisphenol or mixtures thereof. Examples of suitable alkyl phenols include those containing from 7 to 20 carbon atoms, such as p-tertiary octyl phenol, p-tertiary butylphenol, nonyl phenol and dodecyl phenol. Examples of suitable bisphenols include Bisphenol A (4,4'-isopropylidenediphenol), Bisphenol F (4,4'-methylenebisphenol) and Bisphenol S (4,4'-sulfonylbisphenol). Bisphenol A is especially suitable for use in the present invention. The molar ratio of formaldehyde to the phenol is generally about 1:1 to about 1:3, and preferably about 1:1.5 to about 1:2.5.

The polyvinyl alcoholic compound includes polyvinyl alcohols and protected versions thereof, such as complete or partial esters of polyvinyl alcohol and acetals derived from polyvinyl alcohol including polyvinyl butyral and polyvinyl formal. The polyvinyl alcoholic compound can be produced by polymerizing a vinyl ester to produce a polyvinyl ester. The ester groups are then hydrolyzed either partially or fully to generate hydroxyl groups. The hydroxyl groups may be derivatized by reaction with an aldehyde or ketone to produce acetal functional groups, which is, for example, one form of a protected polyvinyl alcohol. Particularly suitable polyvinyl alcoholic compounds for use in the present invention include partially hydrolyzed polyvinyl acetates, a commercial example of which is grade 205 polyvinyl alcohol sold by Air Products.

The phenolic resin may be made by mixing the components together in any order, but it is preferable to add the polyvinyl alcoholic compound last for ease in manufacture. Generally, the phenol is first reacted with formaldehyde in the presence of the catalyst, which may be any conventional catalyst, including various amines and hydroxides, examples of which include caustic sodium hydroxide, triethylamine, ammonia, lithium hydroxide, ammonium hydroxide and triethanolamine. The resulting composition is then generally heated to about 70° C. to about 100° C. The polyvinyl alcoholic compound is thereafter added to the composition, and the resulting composition is allowed to continue to be heated until the polyvinyl alcoholic resin dissolves into the resin.

The polyvinyl alcoholic-containing resins typically have a weight average molecular weight ranging from about 1,000 to about 5,000 as determined by Waters 150 C. gel permeation chromatograph. The resins generally have a free formaldehyde content of typically less than 1% as determined using the hydroxylamine hydrochloride method. The capillary melting points for the resins generally range from about 50° C. to about 85° C. Particularly useful commercial examples of polyvinyl alcoholic-containing resins for practicing the present invention include Durez 33-345 and Durez 33-345B, both manufactured by Occidental Chemical Corporation, Dallas, Tex. Durez 33-345 is a para-tertiary butyl phenol and Bisphenol A-based polymer with formaldehyde and reacted with polyvinyl alcohol. It has a weight average molecular weight of about 2500 and a methylol content of about 25 to 30 wt. %. Durez 33-345B is a para-tertiary butyl phenol and Bisphenol A-based polymer with formaldehyde and reacted with polyvinyl alcohol. It has a weight average molecular weight about 1500 and a methylol content of about 25 to 30 wt. %.

Typically, the amount of polyvinyl alcoholic-containing resin present in the coating compositions of the present invention ranges from about 1 up to and including about 25 wt. %. Preferably, the polyvinyl alcohol-containing resin makes about 5 to 15 wt. % of the non-volatile portion of the present coating composition.

Depending upon the desired application, the coating composition may include other additives such as water, lubricants, coalescing solvents, leveling agents, wetting agents, thickening agents, cure accelerators, suspending agents, surfactants, defoamers, adhesion promoters, crosslinking agents, corrosion inhibitors, pigments and the like. Coating compositions which are to be used as a can coating typically include a lubricant such as a hard, brittle synthetic long-chain aliphatic wax, a carnuba wax emulsion, or a polyethylene/Teflon™ blend. The types of aqueous coating that are found to be most effective in the present invention are those that combine epoxy with acrylic polymers, or epoxy polymers with polyester components to enhance flexibility and reduce viscosity of the coating materials during manufacture. Generally, non-organic solvent-containing coating compositions are preferable in the present invention, because they are more environmentally-benign than coatings containing more than minimal amounts of organic solvent. It should be appreciated, however, that some organic solvent may be used as a processing aid in the manufacture of the inventive coating compositions.

The coating compositions of the present invention may be prepared by conventional methods. For example, the coating compositions may be prepared by adding the carboxy functional and/or hydroxy functional polymeric material to a solution of the epoxy resin in a solvent mixture which may include an alcohol and/or a small amount of water. During the addition, an inert gas blanket is generally maintained in the reactor and the solution of the polymers is warmed, typically to about 100° C. The mixture is maintained at that temperature and stirred until the carboxy functional and/or hydroxy functional polymeric material is dissolved. The tertiary amine (e.g., dimethylethanol amine) is then added and the resulting mixture stirred for a period of time, such as about 30 minutes, at elevated temperature. The resulting resinous mixture is allowed to cool slightly, for example to about 94° C. The polyvinyl alcoholic-containing phenolic resin is then added and the batch is held roughly for 30 minutes at a temperature of about 90° C. to about 100° C. Deionized water is added under maximum agitation to emulsify the resin and the temperature is allowed to drop to ambient temperature. Sufficient additional deionized water is typically added at a uniform rate over a period of about one hour while the batch is cooling to cause inversion and the formation of an aqueous emulsion. The final viscosity is adjusted to the desired value (typically 30–60 seconds in a #4 Ford cup at 80° F.) by further addition of deionized water. The coating composition that is produced may be used as is or other additives (e.g., a lubricant) may be blended in to form the final coating composition.

While the carboxy or hydroxy addition polymer may be prepared separately from, and then combined with, the epoxy resin, ethylenically unsaturated monomer can be polymerized in-situ, in the presence of the epoxy resin, as is known in the art and described, for example, in U.S. Pat. No. 5,830,952 to Pederson, U.S. Pat. No. 4,399,241 to Ting et al., U.S. Pat. No. 4,355,122 to Fan, U.S. Pat. No. 4,308,185 to Evans et al., and U.S. Pat. No. 4,212,781 to Evans et al., which are incorporated herein by reference. Among these references is disclosed a method of polymerizing in-situ addition polymerizable monomer or monomer blend containing ethylenic unsaturation in the presence of an epoxy resin using standard free radical polymerization techniques, resulting in a polymeric mixture including an acrylic resin ("ungrafted addition polymer"), an ungrafted epoxy resin and a graft polymer of the acrylic and epoxy resins ("acid functional graft epoxy resin"). The grafted polymer is predominantly grafted at the aliphatic carbons in the epoxy polymer chain that have one or two abstractable hydrogens. The resulting resin mixture is water dispersable if sufficient carboxylic acid functionality and ionizing agent, such as a tertiary amine, are present.

The coating compositions of the present invention thus may be prepared by the above-referenced in-situ grafting technique by adding the ethylenically unsaturated monomer or monomer blend, at least some of which may be carboxy functional and/or hydroxy functional, and includes a free radical initiator, to a solution of the epoxy resin in an organic solvent mixture which may include an alcohol and/or a glycol ether. The addition is typically conducted continuously and uniformly over a period of one hour while maintaining an inert gas blanket in the reactor and a reaction temperature near about 100° C. The mixture is maintained at about 93° C. to about 98° C. and stirred, with addition of another small amount of free radical initiator, if necessary, until the acrylic monomer is converted to polymer. Tertiary amine (e.g., dimethylethanol amine) is then added and the resulting mixture stirred for a period of time, such as about 30 minutes, at elevated temperature, usually in the range of about 90° C. to about 95° C. The polyvinyl alcoholic-containing phenolic resin is then added and the batch is held roughly for 30 minutes at a temperature of about 90° C. to about 95° C. Deionized water is added under maximum agitation to emulsify the resin and the temperature is allowed to drop to ambient temperature. Sufficient additional deionized water is typically added at a uniform rate over a period of about one hour while the batch is cooling to cause inversion and the formation of an aqueous emulsion. The final viscosity is adjusted to the desired value (typically 30–60 seconds in a #4 Ford cup at 80° F.) by further addition of deionized water. The coating composition that is produced may be used as is or other additives (e.g., a lubricant) may be blended in to form the final coating composition.

The coating compositions of the present invention may be prepared in other various ways. The coating compositions may be prepared and applied as a solvent free hot melt, or may be reduced in viscosity by dilution with organic solvents. If the inventive coating compositions contain sufficient salt groups, they may alternatively be diluted or dispersed into water, as discussed above. The number of salt groups required to convey the coating material into water is well known to those skilled in the art and depends on the nature of the salt group. For example, salt groups based on amine or ammonia neutralized carboxylic acids should be present in an amount of about 35 mg KOH/gm of coating solids. The use of other types of salts, for example, amine neutralized phosphoric acid group, may be conveyed into water at an acid number as low as six. In general, the water base compositions useful in this invention will contain about 0.25 to about 1.0 equivalents and, more preferably, about 0.35 to about 0.75 equivalents of a fugitive tertiary amine per equivalent of carboxy groups present in the carboxy addition polymer.

If the coating compositions are prepared with optional components, such as pigment, the steps of preparation may be varied accordingly. For example, titanium dioxide pigment may be added to the coating composition. Such a coating composition may be prepared by preparing a product formed by the reaction of a carboxy functional or hydroxy functional polymer and epoxy resin, as previously described herein, an example of which, and for the purposes of this example, is an epoxy acrylate. A curing agent, such as melamine formaldehyde curing resin, a suitable commercial example of which is Cymel 385 from Cytek, may be added to the epoxy acrylate to comprise up to about 10 wt. % of the resulting composition. Titanium dioxide pigment, such as R900 titanium dioxide pigment from DuPont, is then blended under high speed agitation with a Hockmeyer blade into a portion of the epoxy acrylate dispersion at a weight ratio pigment-to-dispersion of about 9:1. The resulting pigment paste should be ground to a value of at least about 7, as measured by a Hegman gauge. An amount of the pigment paste is added under moderate agitation to an additional amount of the epoxy acrylate dispersion to produce a composition having a ratio of epoxy acrylate dispersion to pigment paste of about 5:1. The resulting mixture is then diluted with water to produce a product having about 65% to about 70% solids, typically about 68% solids. A small amount of zinc oxide paste, made a similar fashion as the titanium dioxide paste, additional curing agent, and the polyvinyl-alcoholic resol phenolic of this invention, as well as one or more optional additional phenolics, are added to the mixture. The resulting pigmented coating composition typically has a pigment-to-binder ratio of about 0.5:1 to about 0.85:1, and more typically about 0.6:1 to about 0.7:1. Pigment-to-binder ratio is a measure, on the basis of weight, of parts of pigment for every 1 part of resin, or non-pigment, which includes all coating components that are not pigment and not volatilized after the curing step. Embodiments of the present invention which incorporate pigment, such as zinc oxide and titanium dioxide, may particularly protect against headspace corrosion.

The present invention also provides a method of coating the above-described coating compositions to a metal substrate. Metal coatings are generally applied to metal sheets in one of two ways, each of which involves different coating and curing conditions. The coated metal sheets may be fabricated into can bodies or ends in a later stage of the manufacturing operation. One process, called the sheet bake process, involves roll coating large metal sheets. These sheets are then placed up-right in racks and the racks are typically placed in ovens for about 10 minutes to achieve peak metal temperatures of about 180 to about 205° C. In a coil coating process, the second type of process, large rolls of thin gage metal (e.g., steel or aluminum) are unwound, roll coated, heat cured and rewound. During the coil coating process, the total residence time in the curing ovens will vary from about 2 seconds to about 20 seconds with peak metal temperatures typically reaching about 230° C. to about 300° C.

The method of the present invention includes applying a coating composition of the present invention onto the metal surface to form a coating layer and heating the coated substrate so that the coating layer cures to form a cured film which adheres to the substrate surface. The present coating compositions can be used to produce cured films having film weights of about 5 mg/in$^2$ to about 9 mg/in$^2$. The coating composition may be applied to the substrate surface using a variety of well-known techniques. For example, the composition may be roll coated, bar coated or sprayed onto the surface. Where large rolls of thin gauge metal are to be coated, it is advantageous to apply the coating composition via reverse roll coating. Where large metal sheets are to be coated, the coating composition is typically direct roll coated onto the sheets as part of a sheet-bake process. The sheet-bake process is typically used to form a coated metal substrate where a relatively low (e.g., about 3–4 mg/in$^2$), cured film weight is desired. If the coating is applied using a sheet-bake process, the coated metal substrate is typically cured at a temperature of about 180° C. to about 205° C. for about 8 to about 10 minutes. In contrast, when the coating is carried out using a coil-coating process, the coated metal substrate is typically cured by heating for about 2 to about 20 seconds at a temperature of about 230° C. to about 300° C. If the coil-coating process is used to produce material to be fabricated into can ends, the cured film on the coated metal substrate intended for the interior of the can typically has a film weight of at least about 5 mg/in$^2$ and preferably, about 7 to about 9 mg/in$^2$.

The examples that follow are intended to illustrate the use of the invention but are not intended to be limiting in any way.

EXAMPLES

Example 1

Carboxy Functional Polymer A

A three liter round bottom flask was fitted with mechanical stirrer, condenser, heater, and thermometer with inert gas inlet. An inert gas blanket was introduced to the flask. n-Butanol (3636 parts) and 403 parts deionized water were charged to the flask and the solvent mixture was heated under agitation to reflux (96° C.). In a separate vessel, a monomer premix was prepared from 2199 parts ethyl acrylate, 2529 parts glacial acrylic acid and 770 parts styrene by magnetic stirring for 10 minutes. The resulting monomer premixture had (n acid number of 370 and a styrene/acrylic acid/ethyl acrylate ratio of 14/46/40. Next, 431 parts 70% benzoyl peroxide was added to the monomer premix and stirred for 15 minutes.

The combined monomer premix and benzoyl peroxide solution was added to the three liter flask containing the heated butanol/water mixture over four hours while maintaining the temperature at 96°–97° C. After the addition was complete, the batch was cooled to 94° C. and held at that temperature for one hour. After the one hour hold period, an additional 32 parts 70% benzoyl peroxide were added and the batch was held for another one and one-half hours at 94° C. to ensure complete reaction. The final product had an acid number of 349 and contained 56.47% solids.

Example 2

Carboxy Functional Polymer B

A carboxy functional polymer was prepared using a similar procedure to that described in Example 1, except that the ratio of monomers used in Example 2 was 20/40/40 styrene/acrylic acid/ethyl acrylate. The resulting polymer had an acid number of 293.

Example 3

Epoxy Resin-Based Polymer

A one liter round bottom flask was fitted with mechanical stirrer, condenser, heater, and thermometer with inert gas inlet. An inert gas blanket was introduced and 453.8 parts Epon 828 (Shell Chemical Company, Houston, Tex.), 244.3 parts Bisphenol A, 52.6 parts diethylene glycol methyl ether and 6 parts ethyl triphenyl phosphonium iodide catalyst (Shell Chemical Company) were charged to the flask. The mixture was heated with agitation to 130° C. and allowed to exotherm to 173° C. Following the exotherm, the batch was held at 158° C. for 75 minutes. The epoxy value of the resulting resin was 0.043 (EEW of 2325).

Next, 51.7 parts diethylene glycol methyl ether, 8 parts adipic acid and 5 parts tertiary n-butyl amine were charged to the flask, and the mixture was maintained above 147° C. for 75 minutes. The epoxy value of the mixture was 0.026 (EEW of 3846), and the acid number was less than 0.1.

In a separate vessel, a premixture of 130 parts diethylene glycol methyl ether and 58.5 parts diethylene glycol butyl ether was prepared. The heating mantle temperature was reduced to 110° C., and the premixture was added to the one liter flask dropwise over 10 minutes. The resulting composition contained 70.6% solids.

Example 4

Coating Composition

A one liter round bottom flask was fitted with mechanical stirrer, condenser, heater, and thermometer with inert gas inlet. An inert gas blanket was introduced and the entire amount of epoxy resin-based polymer from Example 3 was charged to the flask. The resin was heated to 102° C., and then the entire amount of carboxy functional polymer A from Example 1 was added to the flask over 2 minutes with agitation, followed by further agitation for 20 minutes. The heating mantle temperature was reduced to 90° C., and 30.0 parts dimethylethanolamine was added over 8 minutes, followed by agitation at 100° C. for 30 minutes. This material had an acid number of 47.75 and contained 67.31% solids.

The resinous material was allowed to cool to 94° C. Upon cooling, 45.5 parts Durez 33-345, a commercial polyvinyl alcoholic-containing resin (Occidental Chemical Corporation, Dallas, Tex.), was added, followed by agitation for 30 minutes. The heating mantle was set at 75° C., and water dispersion was initiated by adding 682.9 parts deionized water at a rate of 25 ml every 10 minutes. Inversion occurred approximately one and one-half hours after commencement of the water addition, at which time the heating mantle was removed. The water addition continued until completion and the dispersion was agitated for one and one-half hours with passive cooling to ambient temperature. The final composition contained 44.1% solids and had an average particle size of 0.21 micrometers.

TABLE I

Coating Compositions

| Composition | Carboxy Functional Polymer | Phenolic Resin |
| --- | --- | --- |
| 5A | A | Durez 33-345 |
| 5B | B | Durez 33-345 |
| 6 | A | Varcum 29-401 |
| 7 | A | Durez 33-315 |
| 8 | A | Varcum 29-101 |
| 9 | A | HRJ-12573 |
| 10 | B | Methylon 75-108 |
| 11 | B | Uravar FB-210 |
| 12 | B | Varcum 94-634 |

Table I shows a number of coating compositions that were prepared following the procedures discussed above. Coating 5A was made using the film-forming component of Example 4, which contained polyvinyl alcoholic containing resin made present invention. Coating 5B was made using carboxy functional polymer B from Example 2, and was also prepared using polyvinyl alcoholic containing resin according to the present invention. The particular phenolic used in coatings 5A and 5B is Durez 33-345, which is a para-tertiary butyl phenol and bisphenol A-based polymer with formaldehyde and reacted with polyvinyl alcohol. It has a weight average molecular weight of about 2500 and a methylol content of about 25 to 30%. It is made chemical Corporation, Dallas, Tex.

Coating 6 through 9 were each prepared using carboxy functional polymer A from Example 1, and coatings 10 through 12 were each prepared using carboxy functional polymer B from Example 2. None of these coatings contained the inventive polyvinyl alcoholic containing resin. Varcum 29-401, manufactured by Occidental Chemical Corporation, is a para-tertiary butyl phenol-based polymer with formaldehyde. It has a weight average molecular weight about 1500 and a methylol content of about 16%. Durez 33-315, manufactured by Occidental Chemical Corporation, is a para-tertiary butyl phenol and cresol-based polymer with formaldehyde. Varcum 29-101, manufactured by Occidental Chemical Corporation, is a para-tertiary butyl phenol and cresol-based polymer with formaldehyde. It has a weight average molecular weight about 3350 and a methylol content of about 7%. HRJ-12573, manufactured by Schenectady International, Inc., Schenectady, N.Y, is a bisphenol A-based polymer with formaldehyde dispersed in water with acrylic. Methylon 75-108, manufactured by Occidental Chemical Corporation, is an allyl ether phenol-based polymer with formaldehyde. Uravar FB-210, manufactured by DSM Resins U.S., Inc., Augusta, Ga., is a butylated, etherified bisphenol A-based polymer with formaldehyde. Varcum 94-634, manufactured by Occidental Chemical Corporation, is a Bisphenol A and phenol-based polymer with formaldehyde. It has a weight average molecular weight about 800 and a methylol content of about 12%. It has a weight average molecular weight about 750 and a methylol content of about 17%.

TABLE II

Coating Compositions Comparison

| Composition | MEK Resistance | Water Blush | Acetic Acid Blush | Acetic Acid Blistering |
|---|---|---|---|---|
| 5A | 60 | 10, 10 | 9+ | very slight |
| 6 | 50 | 9, 9+ | 8 | moderate-severe |
| 7 | 65 | 6, 9 | 9 | moderate-severe |
| 8 | 30 | 9, 9 | 8 | moderate |
| 9 | 35 | 10, 10 | 5 | moderate-severe |
| 5B | 35 | 10, 10 | 9 | slight |
| 10 | 30 | 10, 10 | 6 | moderate |
| 11 | 26 | 10, 10 | 7 | moderate |
| 12 | 27 | 10, 10 | 1 | substantial |

Table II shows a comparison of the performance of the coatings from Table I, with the coatings 5A and 5B made according to the present invention, compared to compositions containing various commercially available non-polyvinyl alcoholic-containing phenolics. In each case the coating was applied to commercially available aluminum can end stock using a wire wound bar to a dry coating thickness of 7.5 mg/in². The coated panels were then baked in a simulated coil line oven for 11 seconds to a peak metal temperature of 450° F. (about 232° C.) for approximately one second.

MEK resistance refers to the number of double rubs of a methyl ethyl ketone-soaked cloth the coating withstands before softening and exposing the metal substrate. The water process test (referred to in the above table as "water blush") involves soaking the baked coated panels in deionized water in a pressurizable vessel at 15 pounds per square inch, and 250° F. (about 121° C.) for 90 minutes. The blush rating is on a scale from 0–10, with 10 having no visible blush. The acetic acid process is similar to the deionized water process test except that 3% acetic acid in water is used as the test media and the process time is 30 minutes. In addition to blush, the amount of blistering after the acetic acid process is rated from none to severe blistering.

The inventive coating compositions, 5A and 5B, provide superior solvent, acetic acid resistance and water resistance over the corresponding coatings tested. That is, coating 5A provided better resistance over coatings 6 through 9, which were made with the same carboxy addition polymer used in coating 5A. Similarly, coating 5B exemplified better resistance than coatings 10 through 12, which were made with the same carboxy addition polymer used in coating 5B. These test results indicate that the inventive coating compositions have improved curing and resistance compared with conventional coatings.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A coating composition comprising a film-forming component which includes
   a) a product formed by reacting a mixture including
      i) carboxy functional polymer, hydroxy functional polymer, or a mixture thereof, and
      ii) epoxy resin; and
   b) a polyvinyl alcoholic-containing phenolic resol resin.

2. The composition of claim 1 wherein the carboxy functional polymer includes a copolymer of at least one ethylenically unsaturated carboxylic acid and at least one copolymerizable nonionic monomer.

3. The composition of claim 2 wherein the ethylenically unsaturated carboxylic acid is acrylic acid, methacrylic acid or a mixture thereof.

4. The composition of claim 1 wherein the carboxy functional polymer is a copolymer of acrylic acid, styrene and ethyl acrylate or a copolymer of methacrylic acid, styrene and ethyl acrylate, or a mixture thereof.

5. The composition of claim 1 wherein the carboxy functional polymer has an acid number of about 200 to about 530.

6. The composition of claim 1 wherein the carboxy functional polymer has a glass transition temperature of no more than about 110° C.

7. The composition of claim 1 wherein the carboxy functional polymer has a weight average molecular weight of about 5,000 to about 30,000.

8. The composition of claim 1 wherein the epoxy resin includes glycidyl polyether.

9. The composition of claim 8 wherein the glycidyl polyether includes glycidyl ether of dihydric phenol.

10. The composition of claim 9 wherein the glycidyl polyether is a diglycidyl ether of Bisphenol A glycidyl ether.

11. The composition of claim 1 wherein the epoxy resin has an epoxide equivalent weight of about 1,000 to about 5,000.

12. The composition of claim 1 wherein the epoxy resin is the reaction product of a mixture including aliphatic diacid, aromatic diacid, or a mixture thereof, and glycidyl ether of dihydric phenol.

13. The composition of claim 12 wherein the aliphatic diacid has no more than 8 carbon atoms.

14. The composition of claim 1 wherein the polyvinyl alcohol-containing phenolic resol resin is the reaction product of a mixture including:

a) phenolic compound;

b) formaldehyde; and c) polyvinyl alcoholic compound.

15. The composition of claim 14 wherein the phenolic is selected from the group consisting of an alkylphenol containing 7 to about 20 carbon atoms, bisphenol, and mixtures thereof.

16. The composition of claim 14 further comprising pigment.

17. The composition of claim 16 wherein the phenol includes Bisphenol A and an alkylphenol.

18. The composition of claim 14 wherein the phenol is Bisphenol A.

19. The composition of claim 18 wherein the polyvinyl alcoholic compound includes fully- or partially-hydrolyzed polyvinyl acetate.

20. The composition of claim 18 wherein the polyvinyl alcoholic compound includes fully- or partially-hydrolyzed acetals derived from polyvinyl alcohol.

21. The composition of claim 18 wherein the resol resin comprises about 1 wt. % to about 25 wt. % of the polyvinyl alcoholic compound.

22. The composition of claim 1, wherein the carboxy or hydroxy functional polymer is prepared by polymerization of an ethylenically unsaturated monomer or monomer blend, wherein the monomer or monomer blend includes at least one monomer containing a carboxylic acid group or at least one monomer containing a hydroxy group, in the presence of the epoxy resin.

23. The composition of claim 22, wherein the functional polymer is the carboxy functional polymer and includes a copolymer of at least one ethylenically unsaturated carboxylic acid and at least one copolymerizable nonionic monomer.

24. The composition of claim 23, wherein the ethylenically unsaturated carboxylic acid is acrylic acid, methacrylic acid or a mixture thereof and the nonionic monomer is a lower alkyl acrylate, a lower alkyl methacrylates, a hydroxy alkyl acrylate, a hydroxy alkyl methacrylate, styrene, alkyl-substituted styrene, vinyl acetate, acrylonitrile or a mixture thereof.

25. The composition of claim 24, wherein the functional polymer is a copolymer of acrylic acid, styrene and ethyl acrylate or a copolymer of methacrylic acid, styrene and ethyl acrylate, or a mixture thereof.

26. The composition of claim 22, wherein the product comprises a graft copolymer of the epoxy resin.

27. The composition of claim 22, wherein the product comprises a graft copolymer of the epoxy resin, an ungrafted addition polymer and an ungrafted epoxy resin.

28. A coating composition comprising a film-forming component which includes a) a product formed by reacting a mixture of a carboxy functional polymer with an epoxy resin; and b) a polyvinyl alcoholic-containing phenolic resol resin.

29. The composition of claim 28 wherein the mixture further comprises carboxy functional polymer free of epoxy functional groups.

30. The composition of claim 28 wherein the mixture further comprises epoxy resin free of carboxy functional groups.

31. The composition of claim 28 wherein the carboxy functional epoxy resin includes acid functional graft epoxy resin.

* * * * *